United States Patent
Rogers et al.

(10) Patent No.: US 7,349,872 B2
(45) Date of Patent: Mar. 25, 2008

(54) METHOD FOR COMPARING AND SELECTING PROCESS CONTROL APPARATUS

(75) Inventors: Steven B. Rogers, Minnetonka, MN (US); William F. Graber, Minneapolis, MN (US); John O. Landsom, Brownton, MN (US); Nicole Coolidge, St. Bonifacius, MN (US); Thomas A. O'Banion, Boulder, CO (US); James E. Pomroy, Plymouth, MN (US); Joel R. Lemke, Minneapolis, MN (US); Tonya L. Wyatt, Lafayette, CO (US)

(73) Assignee: Rosemount, Inc., Eden Prairie, MN (US)

( * ) Notice: Subject to any disclaimer, the term of this patent is extended or adjusted under 35 U.S.C. 154(b) by 530 days.

(21) Appl. No.: 10/024,891

(22) Filed: Dec. 18, 2001

(65) Prior Publication Data

US 2003/0115109 A1 Jun. 19, 2003

(51) Int. Cl.
*G06Q 30/00* (2006.01)
(52) U.S. Cl. .................... 705/27
(58) Field of Classification Search ............. 705/26, 705/27, 37; 707/1, 3, 4, 5, 6
See application file for complete search history.

(56) References Cited

U.S. PATENT DOCUMENTS

| | | | |
|---|---|---|---|
| 4,972,318 A | 11/1990 | Brown et al. | |
| 4,992,940 A | 2/1991 | Dworkin | |
| 5,319,542 A | 6/1994 | King, Jr. et al. | |
| 5,357,439 A | 10/1994 | Matsuzaki et al. | |
| 5,710,887 A | 1/1998 | Chelliah et al. | |
| 5,729,698 A * | 3/1998 | Stelter | 705/26 |
| 5,808,894 A | 9/1998 | Wiens et al. | |
| 5,946,210 A * | 8/1999 | Montminy et al. | 700/97 |
| 5,963,915 A * | 10/1999 | Kirsch | 705/26 |
| 6,012,051 A | 1/2000 | Sammon, Jr. et al. | |
| 6,070,149 A | 5/2000 | Tavor et al. | |
| 6,173,210 B1 * | 1/2001 | Bjornson et al. | 705/27 |

(Continued)

FOREIGN PATENT DOCUMENTS

EP 0 803 964 A2 10/1997

(Continued)

OTHER PUBLICATIONS

Faux, et al., Computer Networks and ISDN Systems, "Intellient access, publishing and collaboration in global engineering networking," 1249-1262 (1998).

(Continued)

*Primary Examiner*—Gerald J. O'Connor
(74) *Attorney, Agent, or Firm*—Marshall, Gerstein & Borun LLP

(57) ABSTRACT

A method for comparing and selecting process control apparatus is disclosed. The method employs software, executed on a stand-alone computer device, or accessible through the web, to retrieve data specific to a given process control environment, and calculate the performance characteristics of multiple types of process control equipment capable of meeting the demands of the application. The performance characteristics of each type can be provided in graphical form, at the same time, to enable a potential consumer to readily discern the advantages and disadvantages of each type of process control apparatus. In one embodiment, a purchase of the apparatus may then be made.

25 Claims, 4 Drawing Sheets

U.S. PATENT DOCUMENTS

| | | | |
|---|---|---|---|
| 6,260,004 B1 * | 7/2001 | Hays et al. | 702/183 |
| 6,282,518 B1 * | 8/2001 | Farrell et al. | 705/27 |
| 6,606,570 B2 * | 8/2003 | Bugarin et al. | 705/26 |

FOREIGN PATENT DOCUMENTS

| | | |
|---|---|---|
| JP | 10-094245 | 4/1998 |
| JP | 2001355577 | 12/2001 |
| RU | 596950 | 5/1973 |
| RU | 2172978 | 10/1999 |
| WO | WO-99/22311 | 5/1999 |
| WO | WO-00/19347 | 4/2000 |
| WO | WO-01/20428 A2 | 3/2001 |

OTHER PUBLICATIONS

International Search Report; PCT/US02/36862 report dated Mar. 5, 2003.

Wiklund et al., "Improving Flow Measurement by Real-Time Flow Calculation in Transmitters Having Multiple Process Variables," *Rosemount® Measurement, Fisher-Rosemount™ Managing The Process Better*, 2003.

Foxboro Website, (www.foxboro.com) printout disclosing "Fox Flow" software, printed Mar. 18, 2002.

"Sizing and Selection Software," *Flow Control Magazine*, 21-27 (Jul. 2001).

International Preliminary Examination Report for International Application No. PCT/US02/36862, dated Jan. 28, 2004.

Notice of Reasons for Rejection corresponding to Japanese Patent Application No. 2003-553458.

Decision to Grant issued by the Russian Patent Office in corresponding Russian Patent Application No. 2004121984 (8 pages).

* cited by examiner

METHOD FOR COMPARING AND SELECTING PROCESS CONTROL APPARATUS

TECHNICAL FIELD

The invention generally relates to process control instrumentation and, more particularly, relates to methods for comparing and selecting process control instrumentation for use in a process control environment.

BACKGROUND

In a typical process control environment, fluid lines, tanks, reservoirs, etc. need to be continually monitored and controlled in terms of pressure, flow rate, temperature, fluid level, pressure drop, etc. Such process control environments include myriad examples such as, but not limited to, petroleum refineries, pulp and paper factories, dairies, food and chemical processing plants, and the like.

To properly maintain such facilities, various tools are often employed in an automated fashion. Valves and regulators control flow to and from areas of the process control environment. Such valves and regulators may receive control signals from sensors within the system monitoring flow rate, temperatures, pressures, levels, etc., or may receive control signals from a central processing unit coordinating operation of the entire system.

Under current technologies, the selection of the various process control instruments used in such systems is a time consuming, repetitive, and subjective process. Using flow rate, for example, in the selection of flow meters, the user is often only provided with tabulated numerical data for a particular flow meter under one set of operating conditions. If the customer has a specific process control application to address, the selection process typically requires intensive interaction between a representative of a flow meter manufacturer and one or more engineers from the process control facility.

Such a process is typically performed in person or over the telephone and involves numerous background questions, a series of calculations, a review of the types of flow meters available, and a cost benefit analysis of each. The questions may be directed to the type of fluid being metered, the size and length of the piping to and from the flow meter, the desired accuracy, the cost range, the pressure, temperature, and density under which the fluid flows, as well as other considerations. Based on such information, calculations are then performed, often manually, to determine the size and responsiveness of the flow meter required. Once that information is obtained, the types and manufacturers of the flow meters which are capable of handling the situation are reviewed, and finally a review of the cost of each available apparatus is undertaken.

Recently, elementary software programs have become available which allow for preliminary levels of review. However, such systems typically only serve as an information gathering tool for a particular manufacturer, and result in a particular model or model number being recommended. Little or no justification is provided as to why the particular model has been recommended, nor is sufficient quantitative or comparative analysis provided to enable the user to make an informed decision.

Moreover, such programs only address one type of process control apparatus at a time. If the user wishes to compare various types of flow meters, e.g., Coriolis, vortex, magnetic, thermal mass, ultrasonic, and differential pressure meters, separate entries of information and separate sets of calculations must be made for each. Even after such separate calculations are made, the burden remains with the customer to actually compare the garnered information.

Further detracting from current systems is their inability to allow purchases to made based on such software generated information. Instead, purchases of such process control apparatus can only be made through conventional channels.

SUMMARY

A method of analyzing a plurality of potential process control instruments adapted for use in a specific process control application or environment includes receiving data pertaining to the process control environment, and displaying calculated performance characteristics. The received data is related to the specific process control environment and may be received via a computer device.

Still further, a method of doing business includes providing a computer accessible website, receiving data related to a specific process control application or environment, calculating performance characteristics, displaying the calculated performance characteristics, and enabling each of the plurality of process control instruments, capable of meeting requirements of the specific process control application to be purchased.

Still further, a method of analyzing a flow meter from a group of potential flow meter types includes the steps of entering, through a computer device, data parameters under which the flow meter will operate, and receiving a graphical representation of performance characteristics generated according to the entered data parameters.

These and other aspects and features will become more apparent from the following detailed description when taken in conjunction with the accompanying drawings.

Figure 1:
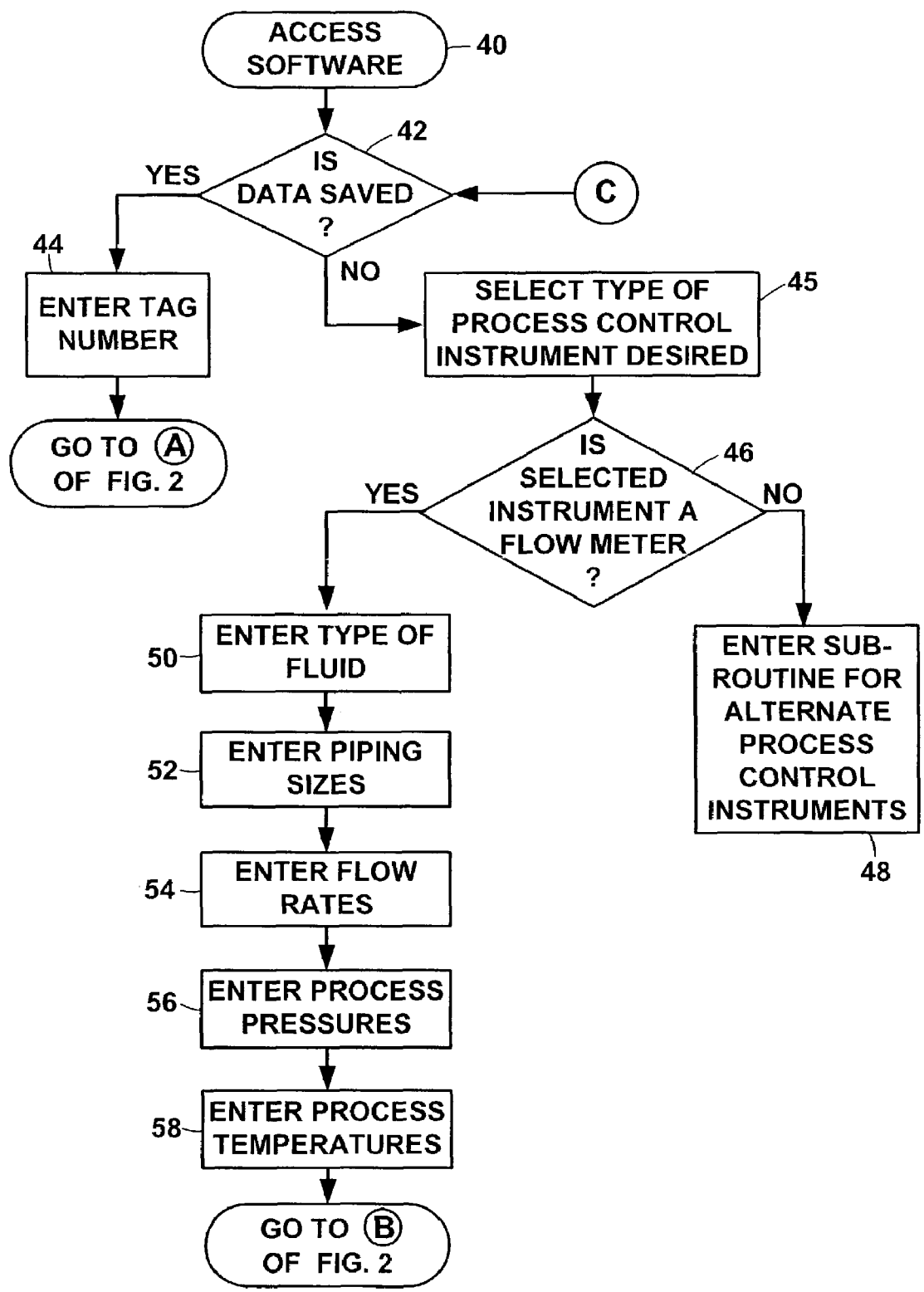
FIG. 1 is a flow chart depicting a sample sequence of operations which may be taken to compare and select process control devices.

While the method and device described herein are susceptible to various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention as defined by the appended claims.

DETAILED DESCRIPTION

Figure 3:
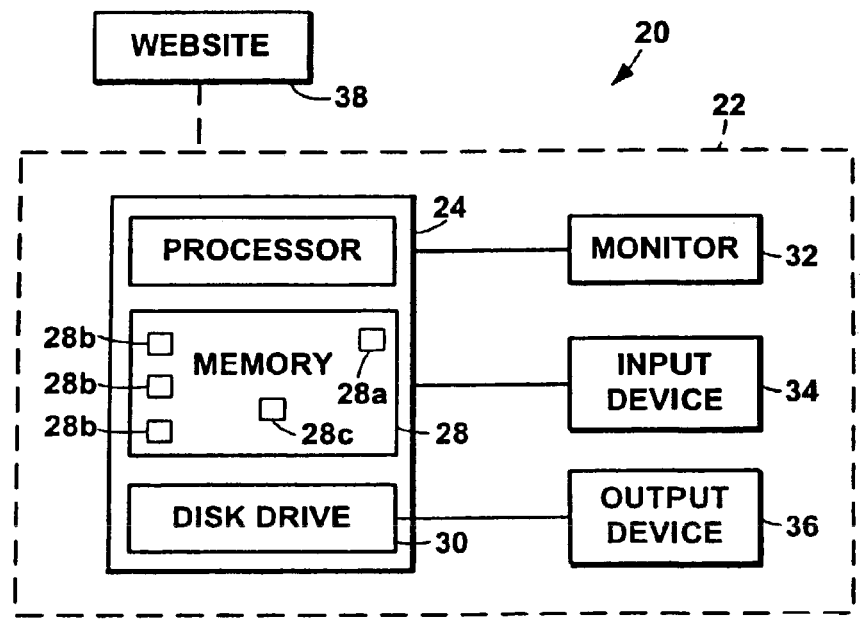
FIG. 3 is a schematic representation of a process control device selection and comparison system.

Referring now to the drawings, and with specific reference to FIG. 3, a system for comparing and selecting process control instrumentation is generally referred to by reference numeral 20. As used herein, process control instrumentation refers to the group of equipment employed in controlling the flow and operation of a fluid processing line or any other type of process. Examples of such equipment include, but are not limited to, flow meters, pressure sensors, control valves, regulators, temperature sensors, fluid level sensors, and the like. For ease of reference in the following description, the system 20 is described in conjunction with the comparing and selecting of flow meters, but it is to be understood that the system and method for selecting process control instrumentation can be employed just as well with any other type of process control instruments.

Referring again to FIG. 3, the system 20 includes a computer device 22 which may be a personal computer of the desktop or laptop variety, or may be any other type of computer device with sufficient processing capability to execute software as herein described. For example, the computer device 22 may be a personal digital assistant, a networked computer terminal, or the like.

The computer device 22 may include a central processing unit 24 having a processor 26, a permanent memory 28 such as a hard drive, and a portable memory unit, such as a disk drive 30. The computer 22 may further include a user interface device such as a monitor 32, an input device 34 such as a keyboard, and an output device 36 such as a printer as well as any other desired peripheral devices. The computer device 22 is also preferably web-enabled so as to allow communication to multiple external websites 38 using conventional communication hardware and software, such as cable, telephone, LAN, WAN, etc. technology. As will be described in further detail herein, software can be operated on the computer device 22 as a stand-alone unit, or may be operated on a server of the website 38 to which the computer device 22 gains access over the internet. As illustrated in FIG. 3, the memory 28 may store a number of software routines including a comparison and selection routine 28a (which may make comparisons of process instrumentation), feature calculations or process or device modeling software routines 28b and a graphics or display routine 28c. Generally speaking, the routine 28a (an example of which is illustrated and described with respect to FIGS. 1 and 2) uses the routines 28b to calculate performance measures or statistics, to model the operation of or otherwise analyze process control instrumentation within a given process environment and displays the results of these analyses to a user of the graphics display routine 28c. The graphics display routine 28c may be any desired user interface type of routine, such as a windowing display or interface, etc. Likewise the routines 28b may be any known or desired modeling routines, such as device or process modeling routines, or other known process instrumentation analysis routines which compute, calculate or determine performance measures or characteristics of a process control device. Different such routines or models for different process instrumentation devices are known to those of ordinary skill in the art and thus will not be described in detail herein.

Figure 2:
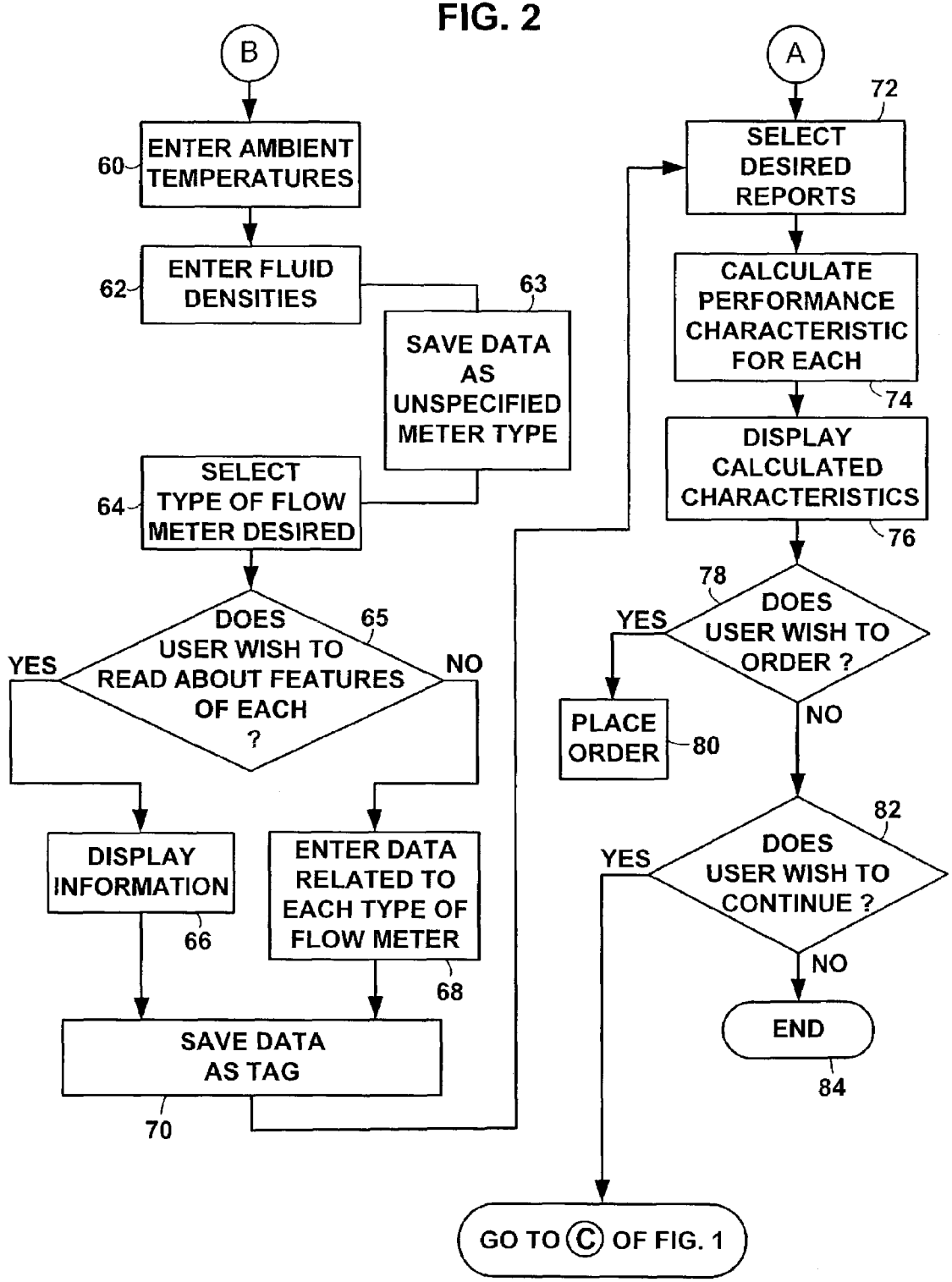
FIG. 2 is a continuation of the flow chart of FIG. 1.

Referring now to FIGS. 1 and 2, a flow chart depicting a sample sequence of steps (or a sample software routine 28a) which may be used to select and compare process control instrumentation is depicted. A first step 40 (which may be implemented in software running on a processor or manually) accesses the software routine 28a. As indicated above, this step 40 may be accomplished by executing the software on the computer device 22, or via the website 38 or any other computer device.

Upon accessing the software for comparing and selecting process control instrumentation, the system 20 inquires, in a step 42, whether a saved file regarding a desired or known process control instrument or process control environment should be accessed. If data related to the process control instrument or environment has already been saved, the user may enter the file name, tag number or other recall mechanism, as indicated in a step 44, to retrieve the data from the memory 28, disk drive 30, website 38 or other storage location. The data may be also be imported from a file saved by another, or from a database of information useable by multiple programs.

The storage device used to store process control instrument data or process control environment data, such as for example, a standalone database or a database associated with a web site, may be updated, as necessary, with the most current specifications available for each of the available process control instruments or most current parameters associated with stored process control environments, thereby providing a user with access to the most current data available for performing the comparison and selection process. In addition, the storage device may be provided with the capability to sort, organize, prioritize, share, report, list, and categorize different types of process control instruments based on user supplied requirements and/or parameters.

If process control environment data or process control instrument data has not been saved, the system 20 proceeds, as indicated by a step 45, to enable the user to specify an environment or instrument by, for example, selecting the type of process control instrument of interest. As indicated above, the software 40 and system 20 can be employed with any type of process control instrument. For the example of FIG. 1, the system 20 may inquire whether the process control instrument of interest is a flow meter, as indicated by a step 46. If this is answered negatively, the system 20 executes subroutines for other types of process control instruments, as indicated in a step 48, until the appropriate instrument is found.

When, for example, the system 20 has decided that a flow meter is desired, a series of queries are posed to obtain information necessary to calculate the performance characteristics of each possible flow meter capable of meeting the demands of the given process control environment (which may also be input by the user or read in from a stored data file). As illustrated in FIG. 1, these queries may include the type of fluid being processed (step 50), the sizes and types of pipings and flow disturbances employed in the line (step 52), the flow rates at which the fluid is expected to travel (step 54), the pressures under which the fluid is transmitted (step 56), the temperatures under which the fluid is transmitted (step 58), the ambient temperature of the line (step 60), and the fluid densities involved (step 62). Any and all of these parameters as well as other parameters may be used to define a process control environment.

It is to be understood that the foregoing operating parameters do not represent an exhaustive list of possibilities. The information also need not be entered as set values, but can be entered as a range including maximum, minimum and normal values, if appropriate. The user may be presented with a series of information gathering screens having the parameter title proximate an active window or windows into which the information can be typed. Alternatively, the user may be selectively prompted with individual screens, each asking for one parameter to be entered. One of ordinary skill in the art will readily appreciate that a variety of software tools can be employed to effectively gather the necessary information. Once all such information is entered, the data can be saved in a step 63. The data may be saved as an unspecified or non-meter specific data type to enable subsequent recalls of the data for sizing and selecting of multiple types of process control apparatus.

An additional question asked by the system 20 concerns the types of flow meters of interest. This step is indicated by a step 64 (FIG. 2), wherein the user is prompted to select from a list of possible flow meters including, but not limited to Coriolis, vortex, magnetic, thermal mass, ultrasonic and differential pressure flow meters types. In so doing, the various types of flow meters offered by the multiple divisions of a company or even by different companies can be selected and compared simultaneously. Moreover, multiple versions of the same type of flow meter may be compared. For example, the vortex type of flow meter of company A can be compared to the vortex type of flow meter of company B. If the user desires further information regarding the features of each type of flow meter, as determined by a step 65, a step 66 (which may call the graphical display routine 28c) enables screens detailing the advantages and disadvantages of each type of flow meter to be accessible. If this is not desired, the system 20 prompts the user to enter information specific to each type of flow meter as indicated in a step 68. For example, if the desired flow meter is a differential pressure (dp) type of meter, the user may be prompted to enter whether the primary element type included is an orifice plate, venturi, nozzle, or annubar.

Once such information is entered, it may be desirable to save the data as a tagged file as indicated in a step 70. This enables multiple analyses to be performed while only entering the information a single time. This also enables other users to perform analyses using data entered by another party or to use the same instrument in other process control environments.

Figure 4:
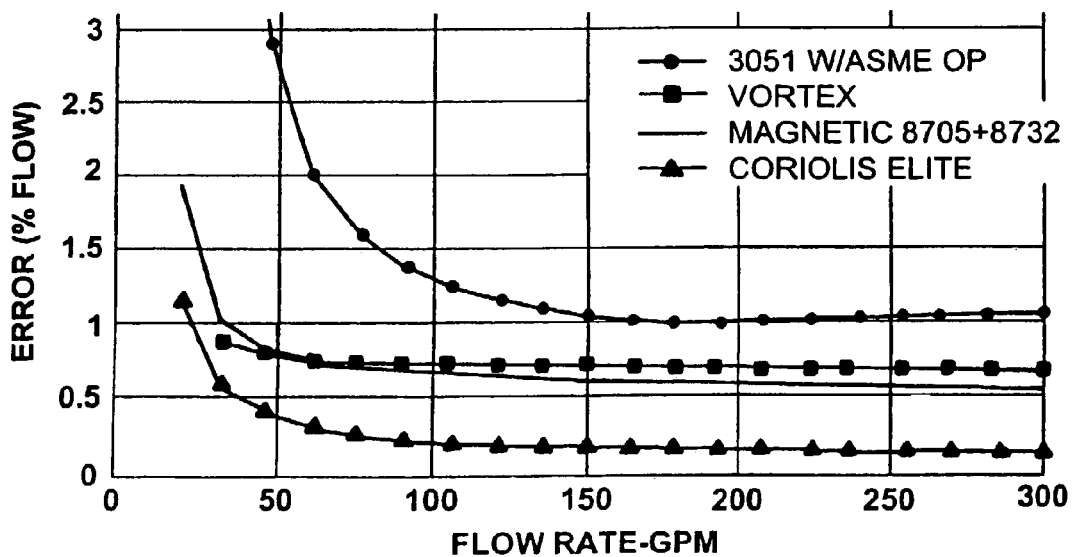
FIG. 4 is a sample graph which may be generated by the system of FIG. 3.
Figure 5:
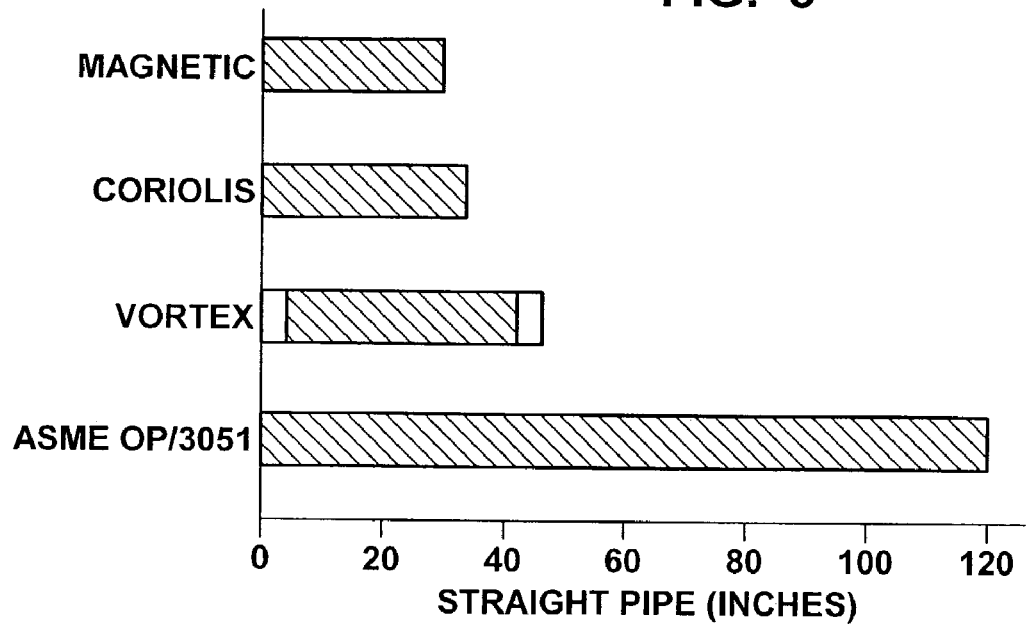
FIG. 5 is another sample graph which may be generated by the system of FIG. 3.
Figure 6:
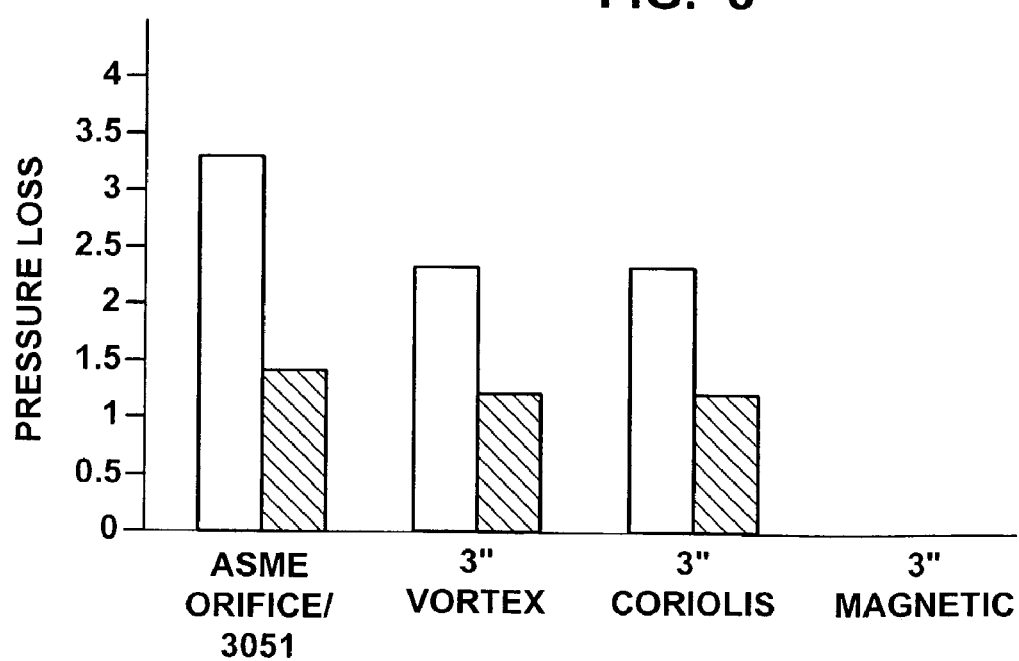
FIG. 6 is another sample graph which may be generated by the system of FIG. 3.

After the entered data is saved, the user is prompted to select the desired types of performance reports to be generated, as indicated in a step 72. As opposed to current technology, which simply provides numerical data in a tabular format for a single set of operating conditions, the system 20 enables detailed, graphical information to be generated over the range of operating conditions to which the flow meter can be expected to be exposed. For example, FIGS. 4-6 illustrate three of the possible graphs which can be generated by the system 20 using, for example, the graphical display routine 28c. More specifically, FIG. 4 plots the accuracy of four different types of flow meters against the flow rate traveling through the flow meter from a minimum level to a maximum level. FIG. 5 plots the total length of piping that is required with each different type of flow meter. Such a graph can be further broken down, as by color coding, to indicate the lengths of piping upstream and downstream from the flow meter, the lengths of reducers and expanders needed, and the length of actual meter pipe required. FIG. 6 graphs the total pressure loss which can be expected for each type of flow meter at both the maximum entered flow rate, and for the normal entered flow rate. Such information can also be provided in tabular form if desired. It is appreciated that these three charts are specific examples of the types of graphical or tabular analysis that can be displayed to the user in various formats.

After the user has entered all required data, selected the types of flow meters of interest, and selected the desired reports, the system calculates the performance characteristics of each flow meter as indicated in a step 74 using one or more routines 28b, and displays the calculated performance characteristics in a step 76 using the aforementioned selected types of charts and the display routine 28c. The user is then able to easily compare and contrast the various types of flow meters as they can be expected to perform once installed. The time savings and convenience of such a system greatly improves upon known device or instrumentation selection processes.

While there are many different types of models or other analyses which can be implemented to model different devices or instruments to enable a user to compare and contrast these instruments within a process control environment, all of these analyses create performance characteristics which may be used to compare and contrast devices to thereby select the best or most desirable device for a particular use or process control environment. In these analyses, the models or routines 28b may calculate performance characteristics of each of a plurality of potential process control instruments over an entire range of operation of each process control instrument, may provide a comparison between installed performance and reference performance for each instrument, may calculate and display performance data as a function of flow rate from a maximum level to a minimum level, may calculate the size of the process control instrument needed to satisfy the process control application, may calculate flow meter accuracy as a continuous function of flow rate, may calculate fluid pressure losses for each of the flow meters, may determine and display straight pipe requirements for use with each type of flow meter which may include straight pipe requirements separated into reducer pipe requirements, expander pipe requirements, pipe fittings, pipe couplings, inches upstream of the flow meter, and inches downstream from the flow meter and may calculate and display (graphically, pictorially, tabularly) permanent pressure loss for each type of flow meter at a maximum flow rate, a normal flow rate and a minimum flow rate to name but a few. Moreover, if a user selects, for example, a two inch flow meter to be used with a three inch pipe, the system 20 is able to calculate and display any additional pressure losses caused by the 3" to 2" reducer and/or 2" to 3" expander.

In addition, the user can be provided with a cost analysis for each flow meter as installed in the user-defined process control environment. To facilitate such cost calculation and display (which may be any suitable form display, including but not limited to, graphical and tabular display), the system 20 may query the user as to, for example, typical costs associated with straight line pipe, pipe fittings, labor, etc. Such information can then be factored into the cost analysis as installed.

If the user is so inclined, an order or orders for equipment can also then be made, as indicated by a step 78. For example, a series of prompts or screens can be generated to enable account information and authorization to be entered, as indicated in a step 80. If the user does not wish to order, the system 20 prompts the user as to whether he or she wishes to continue, as indicated in a step 82. If the user does wish to continue, the system 20 returns to the step 42 to determine if saved data should be accessed in order for the system 20 to continue. If not, the system 20 exits, as indicated by a step 84.

From the foregoing, one of ordinary skill in the art will appreciate that the teachings of the invention can be employed to create a system enabling multiple types of process control apparatus to be simultaneously analyzed in graphical and/or tabular form.

What is claimed is:

1. A method of configuring a process plant related to analyzing a plurality of process control instruments capable of use in a specific process control environment, comprising:

receiving, via a computer device comprising an input device and a central processing unit having a processor and a memory, and selected from one of a desktop computer, a laptop computer, a personal digital assistant, a networked computer terminal, and a server, process environment data related to the specific process control environment in which at least one of the plurality of process control instruments is potentially to be used;

storing the received process control environment data in a memory associated with the computer device in a manner that allows the process control environment data to be accessed at a later time;

receiving, via the computer device, device data indicating device-specific operating characteristics for each of the plurality of process control instruments and storing the received device data in a memory associated with the computer device in a manner that allows the device data to be accessed at a later time;

enabling a user to select a source for at least one of the device data and the process environment data, from which source the computer device receives the at least one of the device data and the process environment data, and wherein the selected source for the at least one of the process environment data and the device data is one of a user input, a memory, and a database;

storing, in a memory associated with the computer device, a modeling routine to model, using the device data, the operation of each of the plurality of process control instruments within the specific process control environment defined by the received process environment data;

using the computer device, the modeling routine, the received process environment data and the device data to model the operation of each of the plurality of process control instruments within the specific process control environment defined by the received process environment data;

determining, based on the modeled operation of each of the plurality of process control instruments, using the computer device, one or more performance characteristics for each of the plurality of process control instruments indicating the modeled performance of each of the plurality of process control instruments when used in the specific process control environment and storing the one or more performance characteristics in a memory associated with the computer device in a manner that allows the one or more performance characteristics to be accessed at a later time;

retrieving the one or more stored performance characteristics from the memory associated with the computer device, to allow display to a user of the one or more performance characteristics; and displaying, via a display device, the one or more performance characteristics for each of the plurality of the process control instruments simultaneously via the computer device to enable a user to simultaneously view the one or more performance characteristics for each of the plurality of process control instruments in a manner that allows a user to choose, from among the plurality of process control instruments, the process control instrument best suited for the specific process control environment in which the process control instrument is to be used.

2. The method of claim 1, where the computer device is a web-enabled device.

3. The method of claim 1, wherein the plurality of process control instruments are each flow meters.

4. The method of claim 1, wherein at least one of the plurality of process control instruments is a Coriolis type of flow meter.

5. The method of claim 1, wherein at least one of the plurality of process control instruments is a vortex type of flow meter.

6. The method of claim 1, wherein at least one of the plurality of process control instruments is a magnetic type of flow meter.

7. The method of claim 1, wherein at least one of the plurality of process control instruments is a differential pressure type of flow meter.

8. The method of claim 1, wherein at least one of the plurality of process control instruments is a thermal mass type of flow meter.

9. The method of claim 1, wherein at least one of the plurality of process control instruments is an ultrasonic type of flow meter.

10. The method of claim 1, wherein receiving the process environment data related to the specific process control environment includes enabling a user to enter the process environment data through a keyboard of the computer device.

11. The method of claim 1, wherein determining the one or more performance characteristics includes calculating the one or more performance characteristics of each of the plurality of process control instruments over an entire range of operation of each process control instrument.

12. The method of claim 11, wherein displaying involves displaying performance characteristics of each of the plurality of process control instruments in a graphical manner.

13. The method of claim 12, wherein displaying provides a comparison between installed performance and performance at reference conditions.

14. The method of claim 1, wherein the process control instruments are flow meters and wherein displaying provides performance data as a function of flow rate from a maximum level to a minimum level.

15. The method of claim 1, wherein determining the one or more performance characteristics further includes calculating the size of the process control instrument needed to satisfy the process control application.

16. The method of claim 1, further including saving the received process environment data in a memory of the computer device.

17. The method of claim 16, further including assigning an electronic tag to the saved process environment data to facilitate later retrieval.

18. The method of claim 1, wherein receiving the process environment data includes receiving a selection of the plurality of process control instruments to be used in the analysis.

19. The method of claim 1, wherein the process control instruments are each flow meters, and wherein the determining the one or more performance characteristics includes calculating flow meter accuracy as a continuous function of flow rate.

20. The method of claim 1, wherein the process control instruments are each flow meters, and wherein determining the one or more performance characteristics includes calculating straight pipe requirements for each of the flow meters.

21. The method of claim 1, wherein the process control instruments are each flow meters, and wherein determining the one or more performance characteristics includes calculating fluid pressure losses for each of the flow meters.

22. The method of claim 21, wherein determining the one or more performance characteristics includes the calculation of pressure loss due to pipe fittings.

23. The method of claim 22, wherein the calculated performance characteristics are displayed graphically.

24. The method of claim 23, wherein the graphical display includes pictorial representations of pipe, pipe fittings, and flow meters.

25. The method of claim 1, wherein determining the one or more performance characteristics involves calculating installed costs associated with the plurality of process control instruments.

* * * * *